(12) United States Patent
Sadler

(10) Patent No.: US 6,445,296 B1
(45) Date of Patent: *Sep. 3, 2002

(54) IDENTIFICATION APPARATUS

(75) Inventor: Robin William Sadler, Newmarket (GB)

(73) Assignee: A.T.L. Agricultural Technology Limited, New Market (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,761

(22) PCT Filed: Aug. 12, 1997

(86) PCT No.: PCT/GB97/02175
§ 371 (c)(1),
(2), (4) Date: Sep. 17, 1999

(87) PCT Pub. No.: WO98/08182
PCT Pub. Date: Feb. 26, 1998

(30) Foreign Application Priority Data

Aug. 21, 1996 (WO) .............................. PCT/GB96/02047
Mar. 5, 1997 (GB) .............................................. 9704566

(51) Int. Cl.⁷ ............................................ G08B 13/14
(52) U.S. Cl. .............................. 340/572.1; 340/572.2; 340/825.54; 343/742; 342/44
(58) Field of Search ................... 340/572.1, 572.2, 340/825.54; 343/742; 342/44

(56) References Cited

U.S. PATENT DOCUMENTS

| 4,274,083 A | * | 6/1981 | Tomoeda | 340/171 R |
| 4,703,327 A | * | 10/1987 | Rosetti et al. | 342/44 |
| 5,084,699 A | * | 1/1992 | DeMichele | 340/825.54 |
| 5,302,954 A | * | 4/1994 | Brooks et al. | 342/44 |
| 5,382,952 A | * | 1/1995 | Miller | 340/825.54 |
| 5,557,085 A | * | 9/1996 | Tyren et al. | 235/380 |
| 5,942,977 A | * | 8/1999 | Palmer et al. | 340/572.5 |
| 6,150,986 A | * | 11/2000 | Sandberg et al. | 343/742 |

\* cited by examiner

Primary Examiner—Daniel J. Wu
Assistant Examiner—Tai T. Nguyen
(74) Attorney, Agent, or Firm—Lee, Mann, Smith, McWilliams, Sweeney & Ohlson

(57) ABSTRACT

A communication system, such as an identification system for use in animal feeding or milking parlors, has a driver (16; 200; 320; 350), which supplies current to an antenna (for example 1; 68; 208; 306; 352). That current causes the antenna to emit power (in the from of a time varying magnetic or electromagnetic field), which energizes a transponder (220) operable to transmit an identification signal (such as an RF signal). The driver and antenna are connected to a parallel inductor, which reduces the total inductance of the load seen by the driver. The antenna may be one of a plurality of antennae, all of which are connected to the same driver. Each antenna is located in a respective stall in a milking or feeding parlors so that the system can identify which animal is in which stall of the parlors at a given time.

16 Claims, 7 Drawing Sheets

IDENTIFICATION APPARATUS

FIELD OF THE INVENTION

This invention relates to communications systems and in particular to identification apparatus for reading electronic identification tags.

BACKGROUND OF THE INVENTION

Identification apparatuses have numerous applications where it is advantageous or necessary to identify and/or locate movable objects. For example, such apparatus can be used in in-store security systems to raise an alarm if a product (fitted with a tag) is being removed from a designated area in the store. Alternatively, the apparatus can be used to identify live stock (carrying the tags) in a milking or feeding parlour.

Many of these types of identification apparatus are used with tags which transmit RF identification signals which cooperate with an RF unit in the apparatus.

Several different designs of electronic tags and RF units are available. One type of tag has an in-built battery to provide the power necessary to operate it. This, however, has been found to have limited application.

Alternatively, the tag may have a passive transponder which obtains power from the apparatus by means of an inductive pickup (which may be provided by the antenna which also transmits an RF identification signal), and which therefore does not require a built-in battery.

In a type of system known as full duplex, the tag receives its charging signal and transmits its identitification signal at the same time.

Alternatively, the tag receives its charging signal during one half of an operating cycle and then transmits its identitification signal during the other half. This is known as a half duplex arrangement.

In both of these systems, the tag receives its energy by means of a charging signal which is generated by the Radio Frequency circuit (RF Unit) and transmitted by an antenna on the identification apparatus. Other parts of the RF Unit act as a receiver and decode the information which is transmitted from the tag when charged and received either by the same antenna or another, specialised receiving antenna also connected to the RF Unit.

In one known identification system the RF Unit is designed to be connected to only one antenna which is located within a distance of about one meter to achieve the maximum read range for the tags. The system operates at a frequency of 134.2 kHz and the antenna and its cable must have a total inductance which is between 26 and 28 micro Henrys (nominally 27). The maximum read range with the standard tags is in the order of 1100 mm when operated with an antenna comprising a coil of either Litz wire (consisting of a large number of very fine, insulated strands) or Speaker Cable (Oxygen Free Copper cable similar to Litz wire but without the individual strand insulation).

Typically, the antenna may have a diameter in the range of a few millimeters (if it is included in a hand held unit) to around one meter (if the antenna is to form. part of a static installation).

Larger heavier tags operating in a different manner can achieve read ranges of more than 3 meters but these are not practical for the majority of uses.

However, if the antenna is to be located further away from the RF Unit, it has to have a reduced inductance to compensate for the increased length of cable needed to connect the antenna to the RF Unit, since the increased length of cable will make a larger contribution to the inductance of the load (i.e. the cable and antenna) connected to the RF Unit.

This reduces the range of the antenna and places a number of constraints on the designs of antenna which can be used in the identification apparatus.

SUMMARY OF THE INVENTION

According to a first aspect of the invention, there is provided a communications system comprising a driver connected to a load, which includes an antenna, and operable to supply current to the load thereby to cause the antenna to emit power to energise a remote transponder, wherein the load includes an inductor connected in parallel to the antenna and driver so as to reduce the total inductance of the load.

If the only inductances in the load are provided by the antenna and the inductor, then the total inductance, LT, of the load is given by the equation $$L_T = 1/L_1 + 1/L_2 - 1$$

where $L_1$ and $L_2$ are the respective inductances of the antenna and the inductor. Thus if, for example, the driver has to see a load of inductance of 27 micro Henrys, and the inductor has an inductance of around 40 micro Henrys, then the antenna can have an inductance of 83 micro Henrys. Thus the invention enables the driver to be used with an antenna of a larger inductance than would be the case in the absence of the inductor. It has also been found that various design constraints on antennae of impedance less than around 27 micro Henrys do not apply to an antenna having an inductance in the range of 75 to 100 micro Henrys which has been found to be a convenient range of possible inductances for at least one application (described below).

Preferably, therefore, the inductance of the inductor is such that the inductance of the antenna can lie in the range of 74 to 93 micro Henrys and the antenna in this case conveniently takes the form of a rectangular coil 850 mm high and 325 mm wide.

The driver may in addition incorporate a tuning inductor of variable inductance to enable the driver to be used with antennae of differing inductances in a given range. In this case, the parallel inductor in the load increases the range of possible inductances of the antennae which can be used, as well as allowing antennae of large inductances to be used.

Where the system is adapted to operate with a load of approximately 27 micro Henrys, the inductor preferably has a inductance of approximately 50 micro Henrys or less, preferably 40 micro Henrys, to enable the system to be used with an antenna having an inductance within the range of 74 to 93 micro Henrys.

Preferably, the inductor is positioned adjacent the driver, so that any cable connecting the antenna to the driver is also connected in parallel with the inductor to the driver.

As a result of this feature, the contribution of the inductance of the length of cable to the total inductance of the load can be reduced. Consequently, the invention also enables the antenna, to be connected to the driver by a relatively long length of cable, and thus to be situated a relatively large distance away from the driver, whilst the inductance of the cable places only minor (or no) practical constraints on the size of the antenna.

Theoretically, it should be possible to use an inductor with an inductance only slightly greater than the required total inductance of the load (for example 27 micro Henrys), and connected in parallel to an antenna having an inductance of several hundred or even thousands of micro Henrys. In practice, the performance of a coiled antenna improves with the number of turns in the coil only until the voltage which is developed across the antenna (and hence the range of the antenna) is limited by the resistance of the wire from which the antenna is constructed. However, the invention does allow the system to be used with a wide range of different types and sizes of antenna constructed from good quality coiled power cable. Generally, the larger the antenna, the fewer the number of turns needed to achieve a given range.

However, again, the resistance of the wire forming the antenna does impose a limit on the maximum voltage and read range which can be achieved.

Preferably, the antenna is connected to the driver by a length of coaxial cable.

Coaxial cable is particularly advantageous since it is relatively cheap, generates low levels of noise and only gives rise to a small degree of antennuation of voltages supplied along the cable.

The system may to advantage be so arranged that the signal emitted by the antenna energises a remote transponder, causing the latter to emit a identification signal. Conveniently, that signal is received by the same antenna and read by the driver. The system therefore functions as identification apparatus for reading and identifying each of a plurality of identification transponders.

The system may have a single antenna connected to the driver and inductor (which is optionally adjacent the driver).

Alternatively, the antenna may be one of a plurality of such antennae, each of which is connected to the driver and the inductor (which is optionally adjacent the driver) by a respective piece of cable.

Preferably, the driver is connected to each cable by a respective switch, and the switches operate in sequence so that the driver is connected to each antenna in turn.

If the antennae are placed at different distances from the driver, the inductances of their connecting cables will correspondingly differ. However, since the cable, and its antenna, is connected in parallel to a further inductor, the effect of those variations in inductance on the overall inductance of the load seen at the driver will be reduced.

Preferably, all of the antennae and corresponding cables are connected in parallel to the same inductor.

This feature is of particular advantage if the system is to be used in an environment, such as in a milking or feeding stall, which is potentially hostile to electronic equipment, since the driver and the switches can be grouped together in a protective housing, whilst the antennae are situated in relatively exposed locations in the stalls.

The invention also lies in identification apparatus for reading and identifying each of a plurality of transponders arranged to emit corresponding identification signals, the apparatus comprising a plurality of antennae for receiving said signals and/or transmitting sufficient power to energise said transponders, and a driver connected to the antennae and operable to supply said power thereto, wherein each antenna is connected to the driver by a respective cable.

Preferably, the driver is connected to each cable by a respective one of a number of switches, such as relays, located adjacent the driver.

The invention also lies in a transponder for a communications system, the transponder comprising an antenna for receiving power, circuitry connected to a load which includes the antenna, which is operable to store power picked up by the antenna for use in the subsequent operation of the transponder, wherein said load includes an inductor connected in parallel with the antenna and the circuitry so as to reduce the total inductance of the load as seen by the circuitry.

The antenna in any of the aforementioned systems may comprise a coiled antenna, and may comprise a plurality of coil elements, provided that the total inductance and resistance of the load complies with the requirements of the unit or circuitry to which it is connected.

BRIEF DESCRIPTION OF THE DRAWINGS

Four embodiments of identification apparatus in accordance with the invention will now be described, by way of example only, with reference to the accompanying drawings in which.

DETAILED DESCRIPTION

Figure 1:
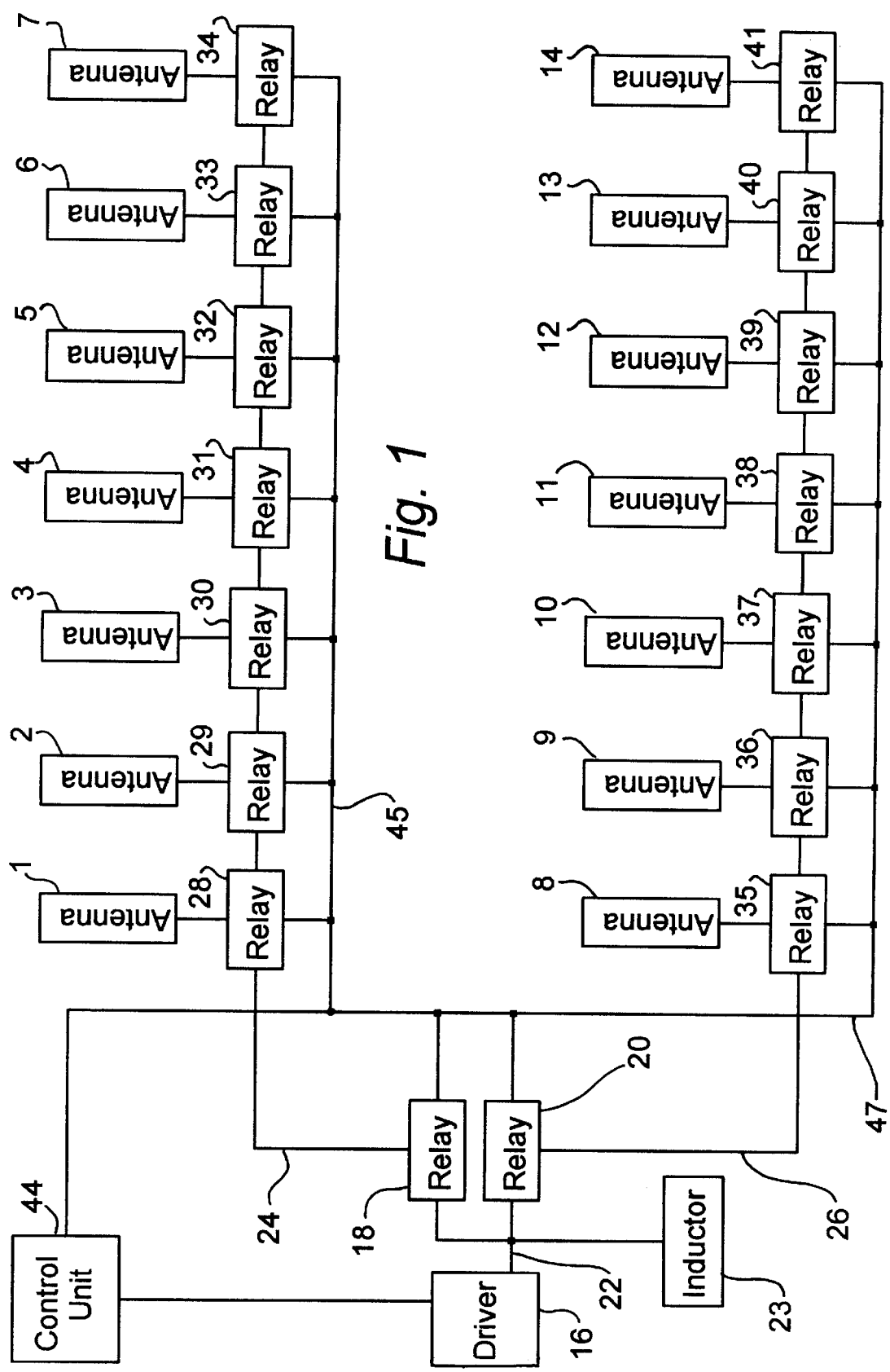
FIG. 1 is a block diagram of the first embodiment of identification apparatus.

The apparatus shown in FIG. 1 is for use in identifying cattle having ear tags each of which contains a transponder. The apparatus comprises fourteen antennae 1–14, each of which comprises a coil of multicore wire and, in use, emits a time varying, for example oscillating, magnetic field for energising a pick-up coil of a transponder in its range so that the transponder can then emit an RF identification signal which is picked up by the antenna.

Figure 7:
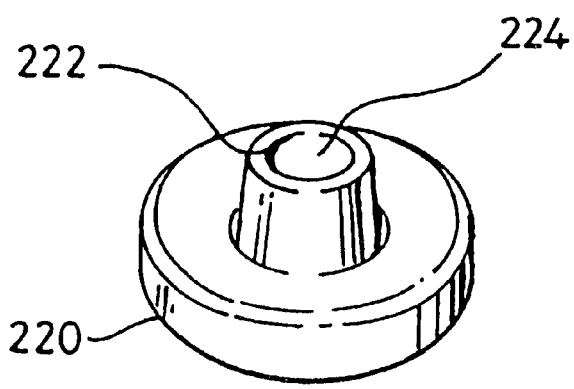
FIG. 7 shows part of an ear tag which houses a transponder for use with any of the embodiments of identification apparatus.
Figure 8:
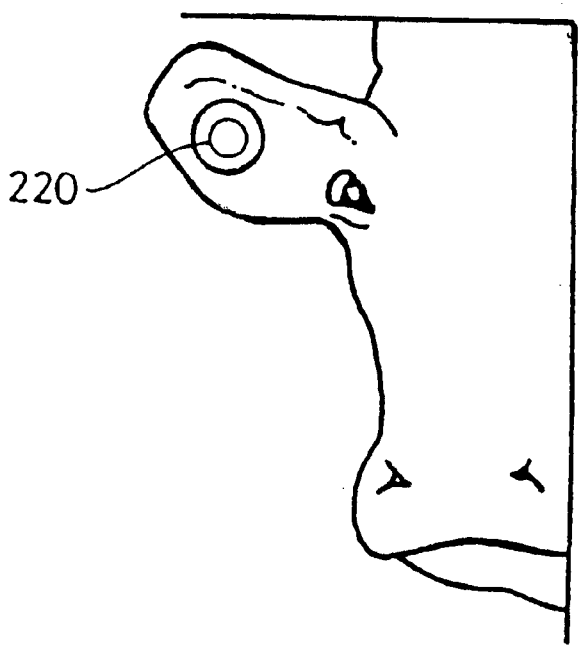
FIG. 8 shows the ear tag fitted to a cow.

One such transponder is housed in the ear tag shown in FIG. 7. The tag comprises a cylindrical body 220 from the rear of which a shank 222 projects. The end of the shank 222 has a socket 224 for receiving a retaining stud (not shown) for holding the tag on a cow's ear. FIG. 8 shows the tag on a cow's ear, the shank 222 extending through a hole in the ear. The stud is attached to the socket 224 after it has been pushed through said hole, so that the ear is sandwiched between the body 222 and the stud.

The currents needed to drive each of the antennae 1–14 are provided by a common driver 16, which in this example comprises a TIRIS 2000 reader supplied by Texas Instruments and which also reads signals received by the antennae from transponders so that the transponders (and hence the cattle wearing the tags) can be identified. The driver has a transmit frequency of 134.2 kHz.

The driver 16 has an RF module for generating an AC current to be fed to the antennae, and a control module which modulates the AC current from the RF module with a pulse signal so that the AC current is supplied in intermittent bursts. The control module also controls the operation of the RF module, decodes and checks data received from the transponders, converts the data into a format suitable for feeding to a serial port of a computer and controls various input and output lines of the reader. The RF module includes an antenna circuit which has a variable inductance tuning coil for enabling an installer to tune the RF circuit to a given antenna.

The driver 16 has a terminal through which said currents are supplied, and through which received signals are fed to the driver, and that terminal is connected to two 1 amp single pole change-over (SPCO) relays 18 and 20 through a cable 22 which forms a two-core bus. Also connected to the terminal of the driver 16 is an inductor 23 of an inductance of 40 micro Henrys connected in parallel across the cable 22 so that the inductor is, in use, connected to the driver 16 in parallel with whichever of the antennae 1–14 is being supplied with current by the driver. Each of the relays 18 and 20 is, in turn, connected to a respective branch cable 24 and 26. The cables 22, 24 and 26 are multi-strand cables formed from oxygen-free copper. The cables are therefore similar to certain types of high quality loud speaker cables. Alternatively, the cables 22, 24 and 26 may be coaxial cables.

Each of the antennae 1 to 7 is located in a respective stall, and the antennae are thus connected to the cable 24, at regular intervals therealong, through corresponding relays 28–34. Similarly, relays 35 to 41 each connect a respective one of the antennae 8 to 14 to the cable 26 at intervals therealong. The relays 28–41 are all of the same type as the relays 18 and 20, and all the relays are connected to a control unit 44 by control lines 45 and 47, which is also connected to the driver 16. Each antenna is connected to its relay by a tail (for example) of 550 mm, or by coaxial cable.

The control unit 44 controls the operation of the relays in such a way that, at any one time in the operation of the apparatus, only one of the antennae 1 to 14 is connected in circuit with the driver 16. The driver 16 supplies a burst of current to that antenna only, and after the burst of current, monitors that antenna for any identifying RF signal from an energised transponder, within the range of the antenna.

Any such signal is read by the driver 16, which then sends a signal, identifying the transponder concerned to the control unit 44 which can correlate that information with the identity of the antenna which received that signal. The process is then repeated for each other antenna of the apparatus in turn.

In this way, the apparatus not only identifies the transponders in the ranges of the antennae, but also determines which transponder is in the range of which antenna, and hence which cow is in which stall. Furthermore, the apparatus enables the operator to notice any cow which is not wearing a tag since such a cow, when in a stall, will not be identified.

In the embodiment of apparatus shown in FIG. 1, all the antennae 1–14 have an inductance in the range 74 to 93 micro Henrys.

In order to set up the driver, the relays 18 and 34 are closed so that the antenna circuit of the driver 16 is in circuit with the antenna 7 only, and the inductance of the tuning coil is altered until the peak to peak voltage in the circuit is at its maximum. This corresponds to the circuit having a resonance frequency of 134.2 kH, i.e. the frequency of the alternating current supplied by the RF module in the driver 16. In this particular example, the inductance seen at the input/output of the antenna circuit when the antenna 7 is connected is 27 micro Henrys, and the inductance of the tuning coil is set at or near the middle of the range of inductances of the tuning coil.

Fine tuning of the antenna 7 is then achieved by connecting a capacitor, not shown, of a suitable capacitance to the circuit, in parallel with the antenna 7.

The circuits containing the antennae 1–6 are then tuned by connecting corresponding capacitors in parallel with those antennae. The capacitance of those capacitors progressively increases from the antenna 7 to the antenna 1 to compensate for the variations (resulting from the circuits having differing lengths of cable) in the effect of the cable 24 on the impedance of the circuits containing the antennae.

Thus, the appropriate choice of tuning capacitor for any antenna enables that antenna to be used at any position on the cable 24.

In addition, a respective variable tuning inductor may be connected in series with each antenna to allow the antenna to be individually tuned. Furthermore, the tuning inductors and/or capacitors can obviate the need to tune the system with the tuning coil.

It will be appreciated that the apparatus can be provided with more or fewer antennae and corresponding relays connected to the branch cables 24 and 26.

The apparatus shown in FIG. 1 is for installation in a milking parlour, each of the antennae 1–14 being located at one end of a respective stall so that each antenna can receive an identifying signal from a transponder on a cow in its stall. The apparatus therefore determines which cows are in which stalls, enabling, for example, the productivity of a dairy cow to be monitored or for each cow to be automatically provided with an amount of feed appropriate to that particular cow.

Figure 2:
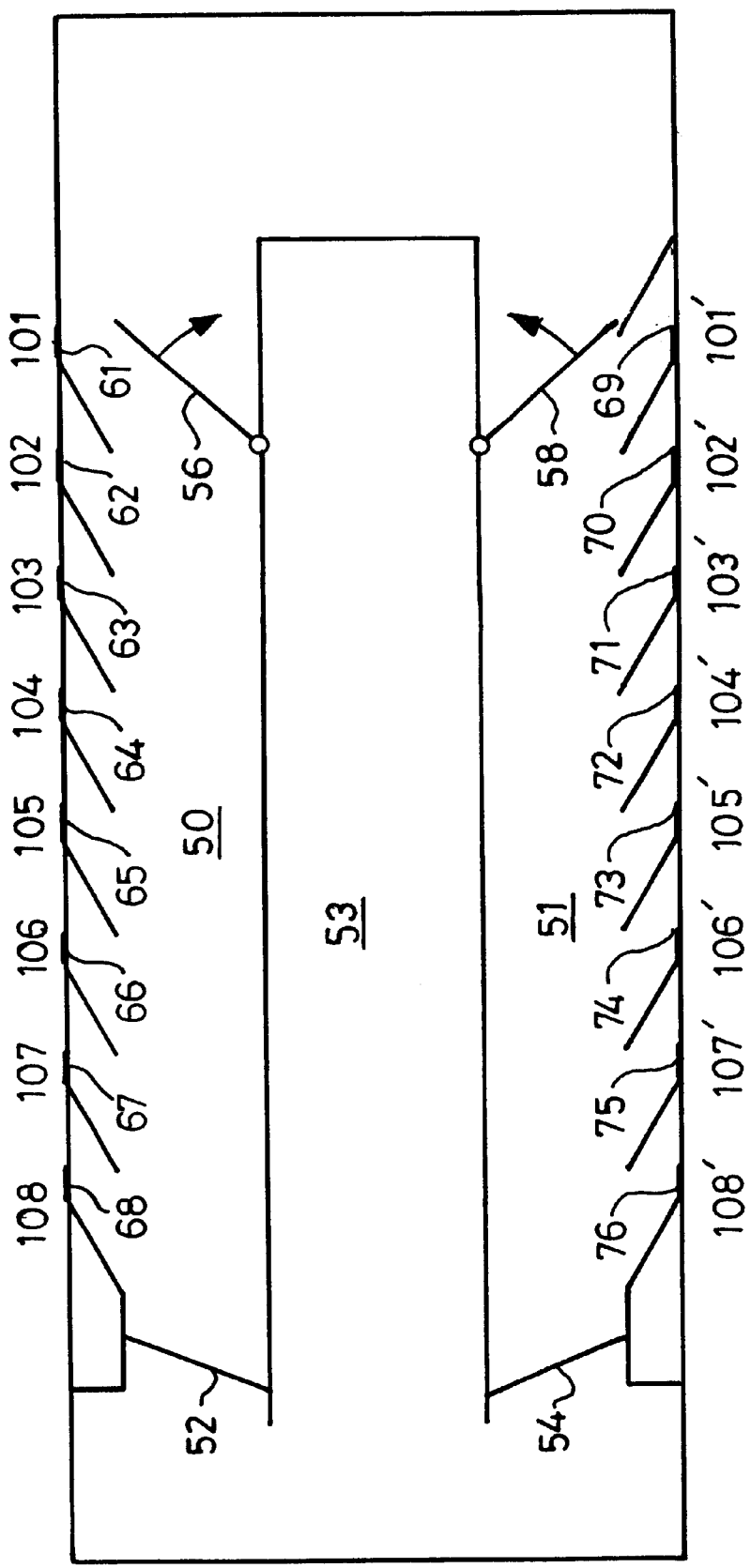
FIG. 2 is a plan view of a herringbone milking parlour in which identification apparatus similar to that shown in FIG. 1 has been installed.

The milking parlour shown in FIG. 2 has sixteen stalls (101–108, 101'–108') arranged in two rows, each of eight stalls. Access to each row of stalls is gained via a respective one of a pair of corridors 50 and 51 which are situated one on either side of a central operator's pit 53. In use, sixteen cows pass through either one of two entry gates 52 and 54, each cow then walking into one of the stalls. After milking, the cows leave the stalls and exit the parlour through exit gates 56 and 58.

Each stall also contains a respective one of sixteen antennae, 61–76. Each antenna forms part of an identification apparatus which is identical to the apparatus shown in FIG. 1 in all details other than the number of antennae connected to each branch cable: eight in this case. One of the branch cables connects the antennae 61–68 to a TIRIS 2000 reader, the other connects antennae 69–76 to the same reader. Each antenna is mounted at its respective stall in such a position that, when a cow enters the stall correctly, its head is adjacent to the antenna.

For the sake of clarity, the components of the identification apparatus other than the antennae have been omitted from FIG. 2.

The antennae 61–76 all have the same inductance. Individual tuning (with parallel capacitors and/or series inductors) compensates for the effect of the differences in lengths of branch cable connecting the antennae to the reader.

The respective circuit containing each antenna is tuned so that the reader sees an inductance of between 26 and 28 (preferably 27) micro Henrys.

In the system shown in FIG. 2, parallel capacitors, not series inductors, are used for tuning. The antennae (68, 76) furthest from the reading head are connected in parallel to capacitors of the smallest capacitance, whilst the capacitors for the antennae (61, 69) closest to the reading head have the largest capacitance. The capacitances of the parallel capacitor for the antennae 61 to 68 are 1.04 nF, 0.9 nF, 0.8 nF, 0.68 nF, 0.56 nF, 0.44 nF, 0.32 nF and 0.2 nF respectively. Each of the capacitors for antennae 69 to 76 has the same capacitance as the corresponding capacitor for the corresponding one of the antennae 61 to 68.

Identification apparatus according to the invention can be used in much larger milking parlors, for example parlors having forty stalls arranged in two rows each of twenty stalls.

If the tags to be read will be sufficiently immobile, it is possible to use a very large number of antennae connected to a common driver. In practice, cost considerations may, in effect, limit the number of antennae which can be connected to a given RF module, since the costs of providing coaxial connecting cable and control cable might equal that of providing a further RF module.

Figure 3:
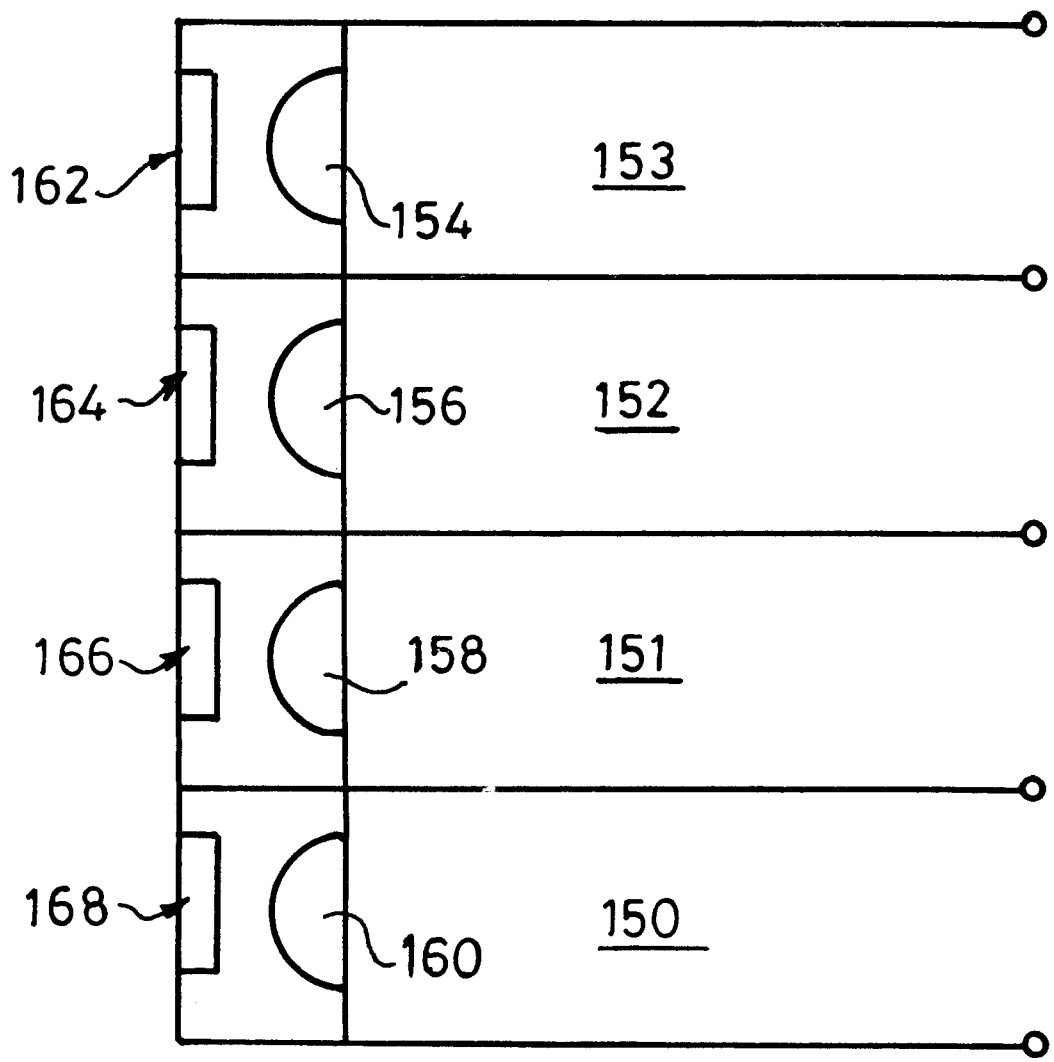
FIG. 3 is a plan view of an out of parlour feed station which can be fitted with similar identification apparatus.

Apparatus according to the invention can also be fitted to an out of parlour feed station, one example of which is shown in FIG. 3. Reference Nos 150 to 153 each denote a respective stall, each of which is fitted with its own manger, respectively referenced 154, 156, 158 and 160 which is supplied with feed from a respective one of four feed dispensing hoppers 162, 164, 166 and 168 fitted above the manger. Each stall is fitted with a respective antenna.

In use, as a cow enters a stall of the feed station, its ear tag is read and a suitable portion of feed is supplied by the dispenser to the cow in that stall. Usually the cow's daily feed ration is divided into portions so that a cow may only receive, for example, a maximum of one quarter of its daily ration in each six hour period.

Figure 4:
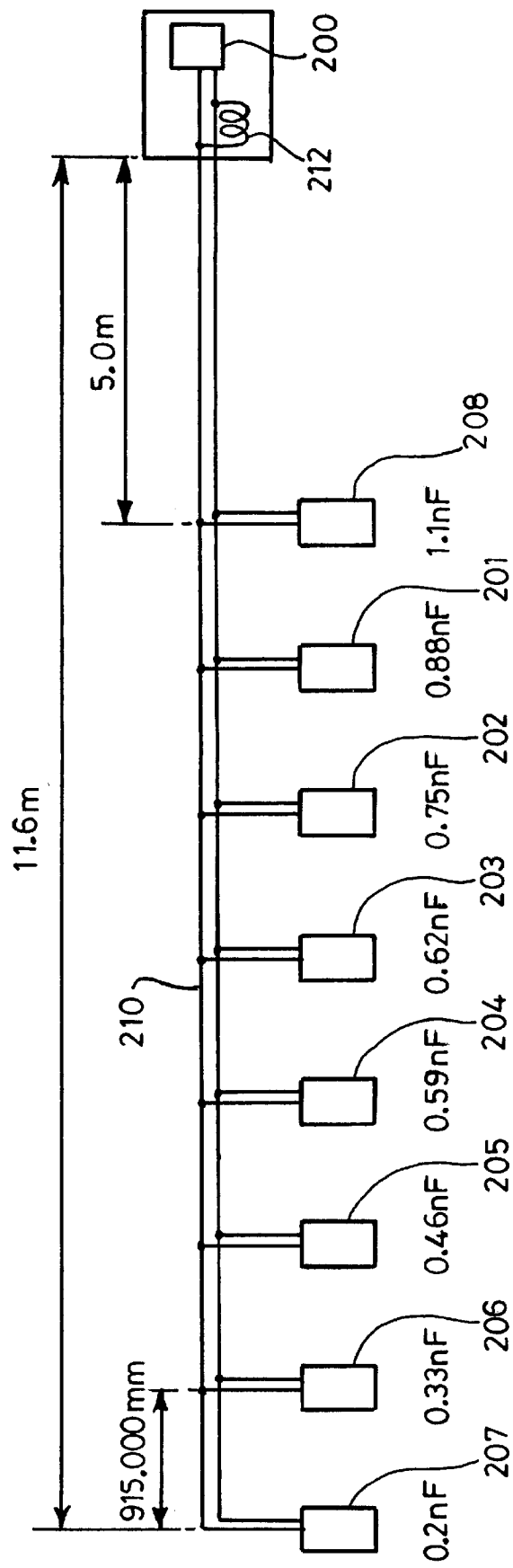
FIG. 4 is a block diagram of part of the second embodiment of identification apparatus.

FIG. 4 shows a TIRIS 2000 reading head 200 which is identical to the head/driver 16 and is connected to 8 antennae 201–208 by a single branch cable 210 of 11.6 meters length, and more clearly shows how a parallel inductor can be connected between a driver and the antennae.

The system includes an arrangement of a control unit, relays and a control line to connect each antenna to the reading head 200 in turn. The control unit relays and control lines are similar to those used in the system of FIG. 1, and have been omitted from FIG. 4 for the sake of clarity.

Each of the antennae 201–208 is connected in parallel to a respective capacitor of a capacitance indicated below the antenna. The apparatus includes an inductor 212 of 50 micro Henrys which is connected in parallel with the antennae 201–208. The inductor 212 reduces the contribution to the load (seen by the head 200) made by the inductance of whichever of the antennae 201–208 is in circuit with the head 200. In fact, the inductance of the load, $L_T$, is given by the following formula:

$$L_T = 1/L_1 + 1/L_2 - 1$$

Where $L_1$ is the inductance of the inductor 212 and $L_2$ is the inductance of the antenna.

As a result, each of the antennae 201–208 can have a higher inductance, and hence more turns, than would be the case without the inductor 212.

As a result, high voltages can be developed across each of the antennae 201–208 by the head 200 (values have been recorded in excess of 200 v (peak to peak voltage)), and the range of each antenna is increased.

Figure 5:
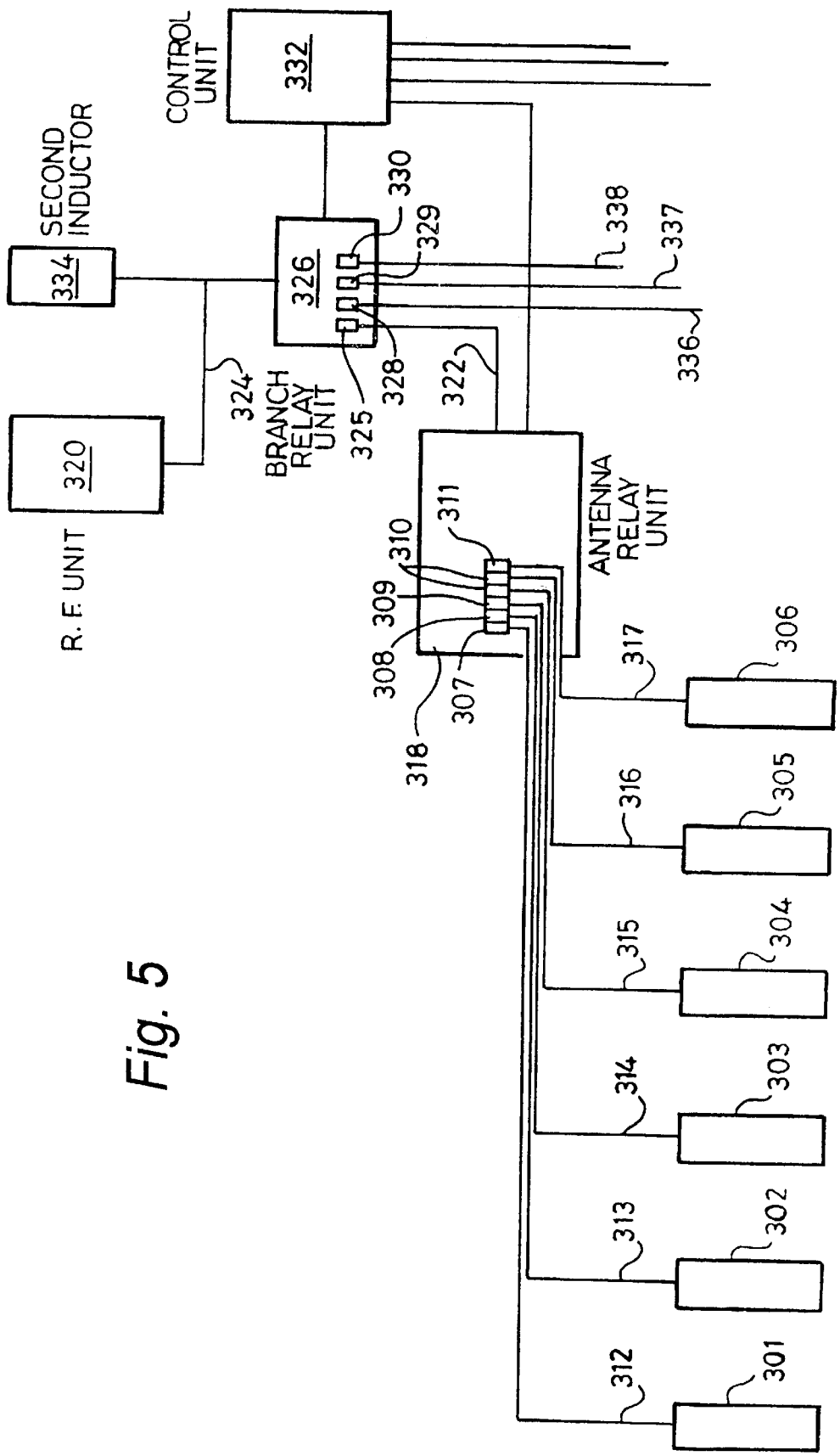
FIG. 5 is a block diagram of the third embodiment of identification apparatus.

The identification apparatus shown in FIG. 5 has six antennae 301–306 similar to the antennae of the first two embodiments, each of which is connected to a respective relay 307–311 via a respective coaxial cable 312–317. The lengths of the cables 312–317 are such that the relays 307–311 can be located remotely from the antennae 301–306 in a single unit 318 in the vicinity of a TIRIS 2000 head 320, to which the unit 318 is connected by coaxial cables 322 and 324 and via a branch relay 325 of a branch relay unit 326.

The branch relay unit 326 includes three other relays 328–330, each of which is connected to a respective further antennae relay unit (not shown) which is similar to the unit 318). Each further antennae relay unit is, in turn, connected to a respective further group of six antennae (not shown) in a similar fashion to the connection between the antennae 301–306 and the unit 318.

The operation of the relays of the system is controlled by means of a control unit 332 which operates in a similar fashion to the unit 44 of the system shown in FIG. 1, and thus so controls the relays that, at any one time, only one of the relays in the unit 326 and one of the relays in the associated antenna relay unit are closed at any one time. Thus, the control unit ensures that the RF Unit, at any time, is connected in circuit with only one of the antennae of the system.

However, each antenna, when so connected, will also be in parallel with a 40 micro Henrys inductor 334 connected to be parallel across the cable 324.

Preferably, the coaxial cables (here referenced 322, 336–338) which connect the branch relay unit 326 to each antenna relay unit (such as 318) are of the same length, and the tuning of the system is simplified if the type and length of cables connecting the additional groups of antennae to their respective antenna unit are similar to the type and lengths of cables used to connect the antennae 301–306 to the unit 318.

The RF Unit 320, inductor 334, control unit 332, and the branch and antennae relay units can all be located adjacent each other and hence away from the stalls in which the antennae are installed, and which may be in an environment generally hostile to electronic equipment.

Figure 6:
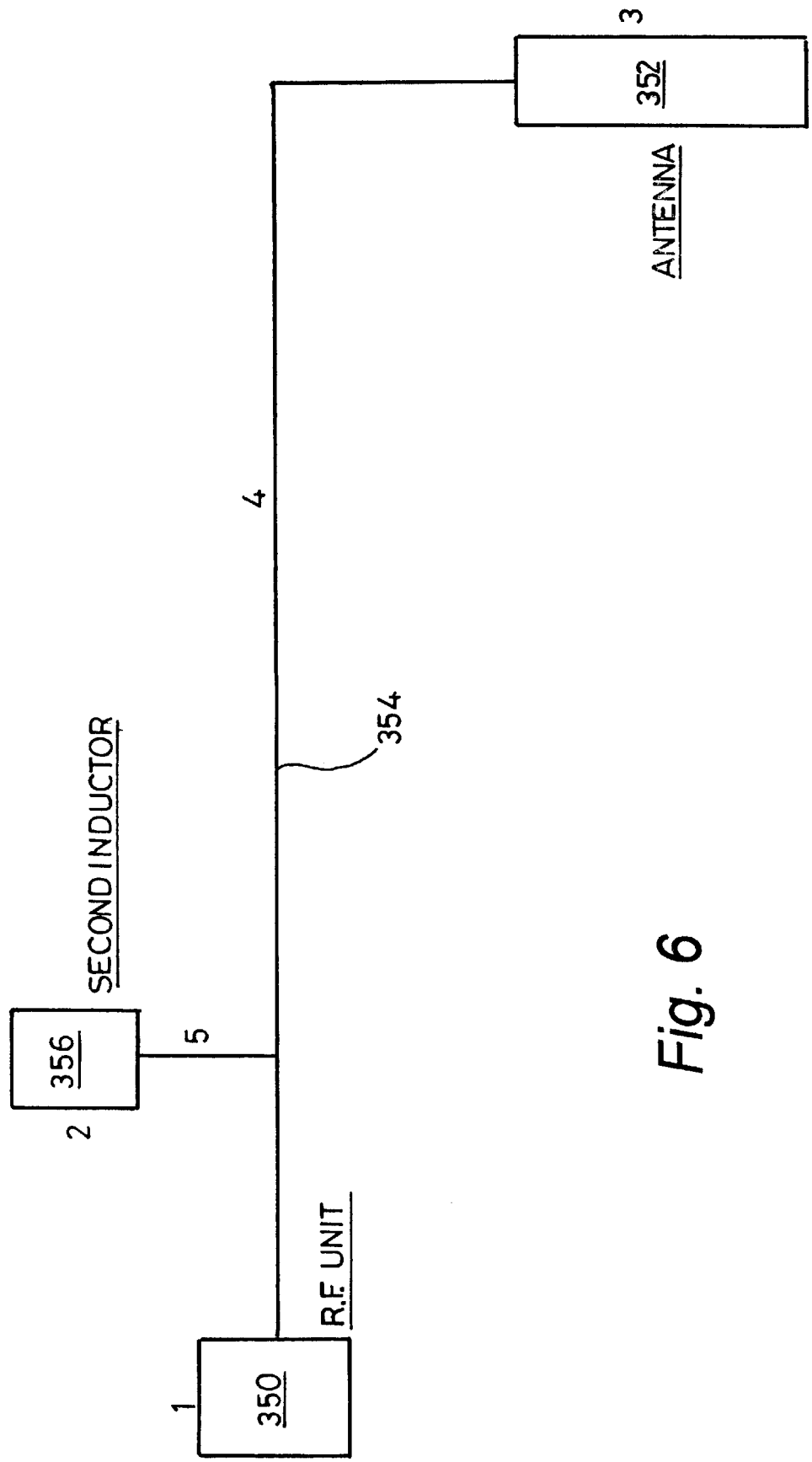
FIG. 6 is a block diagram of the fourth embodiment of identification apparatus.

FIG. 6 shows a simplified version of the identification system in which a TIRIS 2000 reading head 350 is connected to a single antenna 352 along a length of coaxial cable 354, across which a second inductor 356 is connected so that the second inductor 356 and the antenna 352 are connected in parallel. As can be seen from the Figure, the inductor 356 is positioned adjacent the RF Unit 350 so that the majority of the length of cable 354 is also connected to the unit 350 in parallel with the inductor 356. Accordingly, the inductance of that length of cable has a reduced effect on the inductance of the load (constituted by the inductor 356, the antenna 352 and the connecting cables) is reduced.

In all the above described embodiments, the tuning of the antennae to the connected reader is a relatively straightforward process. For example, it has been found that antennae having a total circuit inductance (measured at the reader) which varies over a range of about 2 micro Henrys can be tuned as a group, all having a peak voltage only slightly below the maximum obtainable. Antennae spaced at greater intervals can be tuned by the addition of capacitors connected in parallel to each antenna, but the values of the capacitors need not be precisely determined in order to obtain adequate read ranges, in view of the parallel connection with the inductors.

The distance at which the antenna 352 can be operated from the reader 350 is not constrained by the inductance of the cable 354, but only by its resistance. For example, at a distance of 15 meters from the reader 350, the read range of the antenna 352 is around 900 mm, at a distance of 25 meters 850 mm, and at 100 meters 750 mm.

The improved performance of the parallel inductor system is such that it may be possible to apply the same technique to the inductor coil which forms part of the tag circuit. It should be possible to incorporate a double inductor circuit in such a way that the read range of the tag is substantially improved.

The following notes provide a discussion of various advantages arising from and application of the invention.

1. The performance of the antennae is such that it is possible to create a truly multiplexed system with 10 or more antennae accessed, typically at a rate of up to 10 per second (the reading frequency of the driver circuit).

2. Although the systems described relate to static antennae, the second inductor provides a similar improvement to the performance of the antennae which are used in hand held tag reading units.

3. Antennae can be constructed from most types of wire or multi-cored cable. Small multi-core cable with 5 or 6 cores of 0.22 sq. mm. wire can perform reasonably well, but it has been found that the cross sectional area of the wire can be very important, greater cross section areas having lower resistance and often more strands per conductor. The section of such wire will improve the charging voltage and the receive function of the antenna.

4. The inductor may comprise a simple air coil of 3 turns of 7 core cable. However, if the inductor is to be placed next to a ferromagnetic. substance, it is believed that it would be more appropriate for the inductor to be in the form of an air cored toroidal coil or of a coil wound around the central boss of a ferrite core having the sectional shape of opposed letter Es. Either of these two other types of coil have been found to be less vulnerable to interference from the substance than is the simple coil.

Advantages

1. This invention enables low "Q" antennae constructed with standard copper wire to perform nearly as well as high "Q" antennae. For example, an antenna constructed from 5 core 0.75 sq. mm. cable in the shape of a rectangle 900 mm×400 mm (as per the TIRIS G03 Antenna) provides a read range of 1000 mm against 1150 mm for the G03, and at a fraction of the cost.

2. Greater distances between the antennae and the RF Unit, and use of low cost coax cable, provides the basis for a very economic multiple antennae system.

What is claimed is:

1. A communication system comprising a driver connected to a load, which load includes a transmitter means, the driver being operable to supply current to the load thereby to cause the transmitter means to emit power for energising a remote transponder, characterised in that the load includes an inductor connected in parallel with the transmitter means and driver so as to reduce the total inductance of the load, in that the transmitter means comprises a plurality of antennae each of which is situated at a position remote from the driver and is operable, in addition to transmitting said power, to receive an identification signal from a transponder, and in that said inductor is situated adjacent the driver.

2. A system according to claim 1, in which the system is adapted for use with transponders which are operable to emit electromagnetic and/or magnetic identification signals.

3. A system according to claim 1 in which the transmitter comprises an antenna which, in addition to transmitting said power, is operable to receive an identification signal from a transponder.

4. A system according to claim 3, in which the inductance of the inductor is such that the antenna has an inductance in the range of 74 to 93 micro Henrys.

5. A system according to claim 4, in which the driver is arranged to operate with a load substantially in the range of 26 to 28 micro Henrys, the inductor having an inductance of not more than 50 micro Henrys.

6. A system according to claim 5, in which the inductor has an inductance of 40 micro Henrys.

7. A system according to claim 3 in which the driver in addition incorporates a tuning device of variable inductance to enable the driver to be used with antennae of differing inductances in a given range.

8. A system according to claim 3, in which the inductor is situated adjacent the driver.

9. A system according to claim 3, in which the antenna is one of a plurality of such antennae, each of which is connected to the driver and the inductor by a respective cable.

10. A system according to claim 9, in which the driver is connected to each cable by a respective switch, and the switches operate in sequence so that the driver is connected to each antenna in turn.

11. A system according to claim 9, in which the antennae and corresponding cables are connected in parallel to the same inductor.

12. A system according to claim 9, in which the driver is connected to each cable by a respective one of a number of switches, located adjacent the driver.

13. A system or apparatus according to claim 3, in which the antenna, or one of the antennae, comprises one or more coils of an electrical conductor.

14. A system according to claim 13, in which the inductor is of a generally toroidal shape.

15. A system according to claim 1, in which the antenna is connected to the driver by coaxial cable.

16. A communication system comprising a driver connected to a load, which load includes a transmitter means, the driver being operable to supply current to the load thereby to cause the transmitter means to emit power for energising a remote transponder, characterised in that the load includes an inductor connected in parallel with the transmitter means and driver so as to reduce the total inductance of the load; in that the transmitter means comprise a plurality of antennae each of which is situated at a position remote from the driver and is operable, in addition to transmitting said power to receive an identification signal from a transponder, each antenna being a coil antenna, and in that said inductor is situated adjacent the driver.

* * * * *